(12) United States Patent
Repela et al.

(10) Patent No.: US 10,688,842 B2
(45) Date of Patent: Jun. 23, 2020

(54) LEVELING VALVE FOR DISCHARGING AND SUPPLYING FLUID

(71) Applicant: WABCO Europe BVBA, Brussels (BE)

(72) Inventors: Marek Repela, Wroclaw (PL);
Przemyslaw Zak, Wroclaw (PL)

(73) Assignee: WABCO Europe BVBA, Brussels (BE)

( * ) Notice: Subject to any disclaimer, the term of this patent is extended or adjusted under 35 U.S.C. 154(b) by 77 days.

(21) Appl. No.: 15/971,146

(22) Filed: May 4, 2018

(65) Prior Publication Data

US 2018/0319239 A1 Nov. 8, 2018

(30) Foreign Application Priority Data

May 8, 2017 (EP) .................................. 17000786

(51) Int. Cl.
| | | |
|---|---|---|
| *B60G 17/00* | (2006.01) | |
| *B60G 17/052* | (2006.01) | |
| *F16K 11/10* | (2006.01) | |
| *F16K 11/076* | (2006.01) | |
| *B60G 17/056* | (2006.01) | |

(Continued)

(52) U.S. Cl.
CPC ....... *B60G 17/0525* (2013.01); *B60G 17/056* (2013.01); *B60G 17/0523* (2013.01);
(Continued)

(58) Field of Classification Search
CPC .......... B60G 2500/202; B60G 17/0525; B60G 17/00; F16K 11/074
(Continued)

(56) References Cited

U.S. PATENT DOCUMENTS 2,965,373 A * 12/1960 Heiss ................... B60G 17/048
267/64.18
3,209,784 A * 10/1965 Schwartz ........... B60G 17/0525
137/627.5

(Continued)

FOREIGN PATENT DOCUMENTS

DE 19804552 A1 12/1998
EP 0556086 A1 * 8/1993 ......... B60G 17/0525

(Continued)

OTHER PUBLICATIONS

European Patent Office, The Hague, European Search Report of European Patent Application No. 17 00 0786 dated Sep. 20, 2017, 3 pages.

*Primary Examiner* — Paul N Dickson
*Assistant Examiner* — Hilary L Johns
(74) *Attorney, Agent, or Firm* — Dickinson Wright PLLC

(57) ABSTRACT

A leveling valve (101) for discharging and supplying air from and to a plurality of utilization elements (205a,b), in particular pneumatic suspension bellows, includes a valve arrangement (103) for directing air between a source (207) of pressurized air, an exhaust port (3) and the utilization elements (205a,b), and a supply port (1) in fluid communication with the valve arrangement (103) and the source (207) of pressurized air. A check valve (5) is mounted upstream of the valve arrangement (103) and is configured to allow fluid flow from the supply port (1) towards the valve arrangement (103) and to block fluid flow from the valve arrangement (103) through the supply port (1).

14 Claims, 5 Drawing Sheets

(51) Int. Cl.
  *F16K 15/14*     (2006.01)
  *F16K 17/06*     (2006.01)
(52) U.S. Cl.
  CPC ........ B60G 17/0565 (2013.01); F16K 11/076 (2013.01); F16K 11/105 (2013.01); F16K 15/148 (2013.01); F16K 17/06 (2013.01); *B60G 2202/412* (2013.01); *B60G 2500/2021* (2013.01)
(58) Field of Classification Search
  USPC ..................................................... 280/6.157
  See application file for complete search history.

(56) References Cited

U.S. PATENT DOCUMENTS

| | | | | |
|---|---|---|---|---|
| 4,886,092 A | * | 12/1989 | Barzelay | B60G 17/0525 |
| | | | | 137/627.5 |
| 2011/0101257 A1 | * | 5/2011 | Morris | B60G 17/0525 |
| | | | | 251/129.01 |
| 2014/0346748 A1 | * | 11/2014 | Harla | B60G 11/27 |
| | | | | 280/124.16 |

FOREIGN PATENT DOCUMENTS

| | | | |
|---|---|---|---|
| EP | 0556086 A1 | | 8/1993 |
| EP | 2806194 A1 | | 11/2014 |
| WO | 9309368 A1 | | 5/1993 |
| WO | 2010089089 A1 | | 8/2010 |
| WO | 2013000824 A1 | | 1/2013 |
| WO | WO-2013000824 A1 * | 1/2013 | ........... F16K 15/148 |

\* cited by examiner

LEVELING VALVE FOR DISCHARGING AND SUPPLYING FLUID

TECHNICAL FIELD

The present invention relates to a leveling valve for discharging and supplying air from and to a plurality of utilization elements, in particular pneumatic suspension bellows, the leveling valve comprising: a valve arrangement for directing air between a source of pressurized air, an exhaust port and the utilization elements, and a supply port in fluid communication with the valve arrangement and the source of pressurized air.

BACKGROUND

Leveling valves of the aforementioned type are for example known from WO 2010/089089. Also, leveling valves of the aforementioned type are known from EP 2 806 194 A1.

Leveling valves of the known type are commonly used to regulate the vertical clearance of a vehicle such as a truck or other utility vehicle with respect to ground level. Depending on the load situation of the vehicle or depending upon dynamic forces acting on the utilization elements such as pneumatic suspension bellows of a vehicle, it is in certain situations necessary to increase or decrease the suspension level of the utilization elements. This is achieved by switching the leveling valve, in particular the valve arrangement, from its neutral position to either an "exhaust" switching position or an "air supply" switching position. Depending on the switching position, air will be exhausted from the utilization elements into the atmosphere, or will be supplied to the utilization elements from a source of pressurized air.

The leveling valve known from WO 2010/089089 focuses on possible ways of decreasing the number of sealing elements used inside a valve by making a non-rotatable valve disc axially movable inside a valve housing, wherein the two valve discs are pressed against each other by pressure prevailing in either a line connected to the source of pressurized air or in a line connected to the utilization elements.

In comparison to WO 2010/089089, EP 2 806 194 focuses on providing an improved leveling valve with better reactivity when switched, while at the same time providing a system which emits less noise.

A further desirable improvement for leveling valves would be that, in rare instances, when the air pressure on the supply side of the leveling valve breaks down, for example due to unforeseen damages to the fluid conduits, air is prevented from inadvertently flowing out through the supply port of the leveling valve, to maintain the inflation of the utilization elements. Ever increasing competitive demands in the industry favor solutions which are economically feasible while at the same time providing enhanced safety.

SUMMARY

It was therefore an object of the present invention to provide a leveling valve with improved safety, in particular against inadvertent collapse of the utilization elements. In particular, it was also an object of the invention to do so while at the same time providing a cost-efficient way of improving the leveling valve.

The leveling valve according to a first aspect of the invention has a check valve, which is mounted upstream of the valve arrangement, the check valve being configured to allow fluid flow from the supply port towards the valve arrangement and to block fluid flow from the valve arrangement through the supply port. This aspect is based upon the realization that the location on the supply port side of the leveling valve is an ideal spot for mounting the check valve. It requires minimal adaptations to the remaining design and is therefore also an attractive solution from a cost-perspective. Furthermore, by blocking fluid flow in the reverse direction, any potential failure on the side of the pressurized air source or in the fluid conduits connecting the source of pressurized air and the leveling valve can no longer have adverse effects on the utilization elements which maintain reliably pressurized because of the check valve.

Preferably, the check valve is mounted into the supply port. By integrating the check valve into the supply port, the check valve itself is safely protected from external influences.

In a preferred example, the supply port of the leveling valve comprises a first elongate section holding the check valve, and a second elongate section adjacent the first elongate section holding a connector, the connector being configured for sealingly connecting a fluid conduit to the supply port.

Preferably, the first elongate section and the second elongate section merge into one another through a transition section, which preferably is conically tapered. By mounting the check valve next to the connector, the connector can serve the dual purpose of providing sealing connection for the fluid conduit, while at the same time also securing the check valve inside the supply port. This facilitates and expedites the mounting procedure.

According to a further aspect, the connector has an inner dimension such that when in the mounted state, the fluid conduit abuts against the check valve. Particularly preferred, the check valve is configured to center the air conduit inside the supply port.

In a further development, the check valve comprises a base body having an inlet side, an outlet side, an outer periphery and a flow path extending through the base body from the inlet side to the outlet side, and a lip seal. Preferably, the flow path extends at least partially along the periphery of the base body. Further, the lip seal comprises a sealing lip that is configured to abut against a wall of the supply port when mounted, flexing away from the wall in response to air flowing from the inlet side towards the sealing lip, and to sealingly lie against the wall in response to air flowing from the outlet side towards the sealing lip.

The sealing lip may be inclined at an angle towards the outlet side, which facilitates flexing away from the wall in response to flow directed from the inlet side towards the outlet side. At the same time, the angle of inclination reliably prevents the sealing lip to flex the "wrong" way in response to flow coming from the outlet side towards the inlet side of the check valve. The inclination angle preferably is in a range of 5° to 85° with respect to a longitudinal axis of the check valve.

In a further example, the base body comprises a recess, preferably annular, on the outer periphery, and the lip seal is in mating engagement with the recess when mounted to the base body. Under mating engagement, a substantially form-fitting engagement is understood.

The sealing lip may include an annular base which sits inside the recess, wherein the sealing lip is radially extending, preferably inclined as defined hereinabove, from the base.

In particular, the base and sealing lip of the lip seal may be one monolithic part.

According to another example, the check valve consists of the base body and the lip seal. In other words, the preferred check valve comprises exactly two parts. It is beneficial for the design of the check valve out of two parts only if the lip seal is provided on the outer periphery of the check valve base body. By doing so, no further sealing elements are required.

According to a further example, the base body comprises a first lateral passage configured to guide the flow path towards the periphery of the base body, and a second lateral passage configured to guide the flow path away from the periphery of the base body, the lip seal being arranged in between the first and second lateral passage. By guiding the flow path to the outer periphery with the first and second lateral passages, a large cross-sectional area is made available for air flow through the check valve.

Preferentially, the base body comprises at least one (first) positioning element, the first positioning element being configured to radially define the mounting position of the check valve. In this, the first positioning element preferably is formed as a radial protrusion, e.g. a ring or a plurality of ring segments. Further preferably, the first positioning element also is configured to be a centering stop for the air conduit, which is mounted into the connector of the leveling valve.

Alternatively or additionally, the base body preferably comprises at least one (second) positioning element, the second positioning element being configured to axially and radially define the mounting position of the check valve. The second positioning element is preferably formed as a radial and/or axial protrusion on the outlet side of the base body and serves as an end stop for the base body inside the supply port as well as a centering aid for the check valve.

The base body is preferably made of a thermoplastic polymer. Preferably, the thermoplastic polymer comprises or consists of polyoxymethylene (POM).

The lip seal preferably is made of a rubber-elastic polymer. Particularly preferred, the lip seal comprises or consists of nitrile-butadiene rubber (NBR), such as NBR 70. Alternatively, the lip seal preferably comprises or consists of a fluoropolymer, in particular a fluorocarbon-based synthetic rubber such as a fluoroelastomer (FKM).

The invention has hereinabove been described with respect to the leveling valve. In a second aspect, however, the invention also relates to a check valve for use in a leveling valve for discharging and supplying air from and to a plurality of utilization elements. In particular, the check valve is configured for use in a leveling valve according to any one of the preferred embodiments described hereinabove. The check valve comprises a base body having an inlet side, an outlet side, an outer periphery and a flow path extending through the base body from the inlet side to the outlet side and a lip seal.

Preferred embodiments of the check valve are the same preferred embodiments mentioned hereinabove with respect to the leveling valve. Also, the advantages discussed hereinabove with respect to the leveling valve are the same advantages achieved by the check valve in itself.

According to a further aspect, the invention relates to an air suspension system for use in a vehicle, in particular for use in a commercial vehicle. The air suspension system comprises a plurality of utilization elements, in particular suspension bellows, a leveling valve for discharging and supplying air from and to the utilization elements, and a source of pressurized air connected to a supply port of the leveling valve. The invention achieves the object described hereinabove by providing a leveling valve according to any one of the preferred embodiments described hereinabove in the air suspension system.

In a further aspect, the invention relates to a vehicle, in particular commercial vehicle, comprising a plurality of tires mounted on a vehicle axle, a super structure and an air suspension system axle coupling the axle to the super structure, wherein the air suspension system is an air suspension system as described hereinabove.

For a more complete understanding of the invention, the invention will now be described in detail with reference to the accompanying drawings. The detailed description will illustrate and describe what is considered as a preferred embodiment of the invention. It should of course be understood that various modifications and changes in form or detail could readily been made without departing from the spirit of the invention. It is therefore intended that the invention may not be limited to the exact form and detail shown and described herein, nor to anything less than the whole of the invention disclosed herein and as claimed hereinafter. Further the features described in the description, the drawings and the claims disclosing the invention may be essential for the invention considered alone or in combination. In particular, any reference signs in the claims shall not be construed as limiting the scope of the invention. The wording "comprising" does not exclude other elements or steps. The wording "a" or "an" includes a plurality.

BRIEF DESCRIPTION OF THE DRAWINGS

In the drawings,

FIG. 1b shows a detail view of FIG. 1a;

FIGS. 2a, 2b, 2c, and 2d show a check valve according to an example used in the leveling valve of FIGS. 1 and 1a.

DETAILED DESCRIPTION OF THE DRAWINGS

Figure 1:
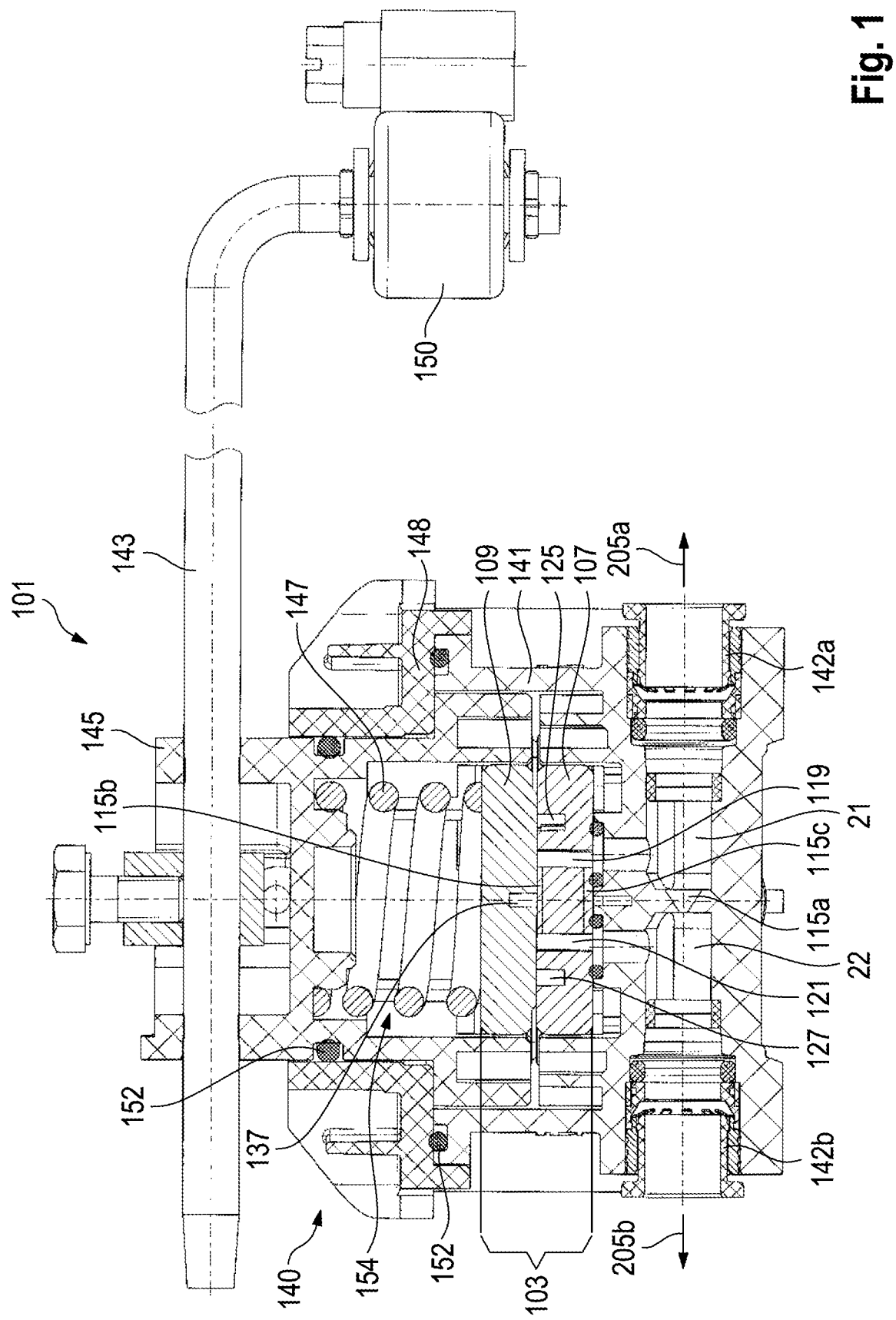
FIG. 1 shows a cross-sectional view of a leveling valve according to a first embodiment.
Figure 1A:
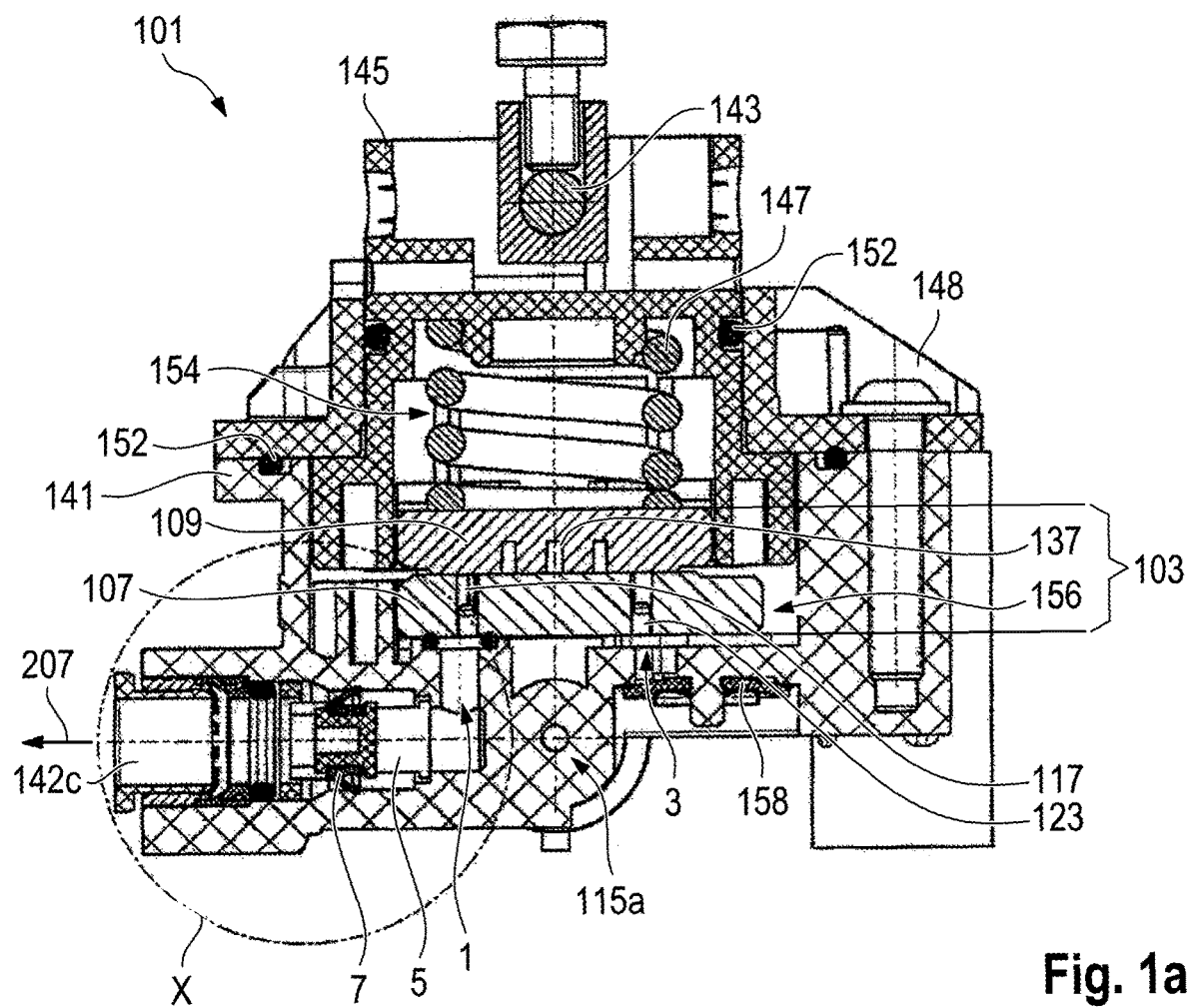
FIG. 1a shows a further cross-sectional view of the leveling valve according to FIG. 1.
Figure 1B:
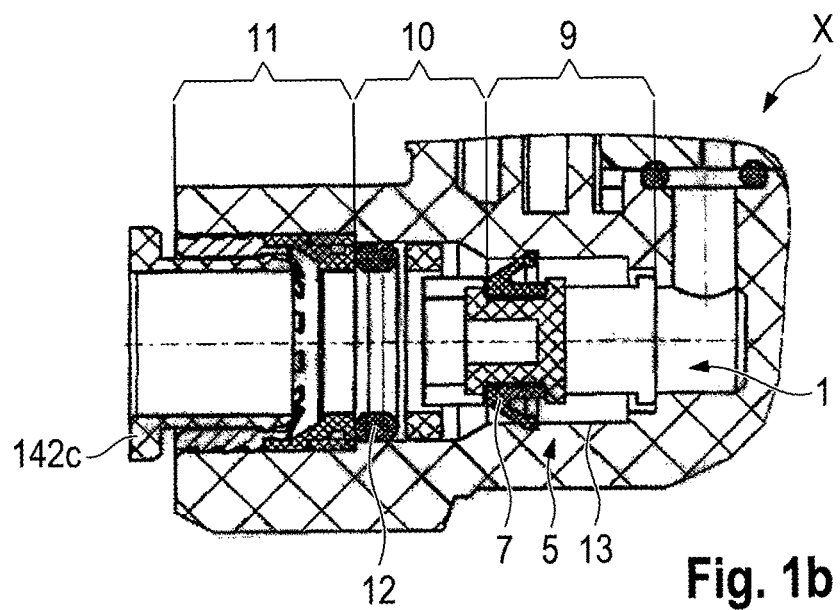

A leveling valve 101 in accordance with a preferred embodiment of the invention is depicted in FIG. 1, FIG. 1a and FIG. 1b. The leveling valve 101 comprises a valve arrangement 103 for directing air between a plurality of utilization elements 205a,b and either a source 207 of pressurized air or an exhaust port 3. The valve arrangement 103 is a valve disc arrangement. It comprises a first valve disc 107 and a second valve disc 109. The first and second valve discs 107, 109 of the valve arrangement 103 comprise respective flow portions forming flow paths for guiding the air through the valve.

The first and second valve discs 107, 109 are rotatable with respect to each other. In the preferred embodiment of FIG. 1, the first valve disc 107 is mounted to be stationary inside a housing 140 of the leveling valve 101. The second valve disc 109 is mounted to be rotatable inside the housing 140. The housing 140 of the leveling valve 101 comprises a base body 141. The first valve disc 107 is mounted non-rotatably inside that base body 141. The housing 140 further comprises a rotatable housing part 145 which is fastened to the base body 141 by way of a housing lid 148 and extends into the base body 141. Inside a first air plenum 154 formed between the rotatable housing part 145 and the base body 141, a resilient means, for example in the form of a spring 147, is located and effective to push the second valve disc 109 towards the first valve disc 107 in order to establish a sealing, preferably air-tight relationship between the valve discs 107, 109 of the valve arrangement 103 and the housing, in particular with respect to the base body 141 of the housing 140.

The base body 141 of the housing 140 comprises a first fluid channel 21 at the end of which there is located a connector 142a for connecting the leveling valve 101 and in particular the first fluid channel 21 to a utilization element 205a of a vehicle (FIG. 6). Further, the base body 141 comprises a second fluid channel 22. At the end of the second fluid channel 22 there is located a connector 142b for connecting the leveling valve 101 to a second utilization element 205b. Utilization elements 205a,b may for example be pneumatic suspension bellows of a truck vehicle, wherein the first utilization element 205a might be right side suspension bellow of a vehicle whereas the second utilization element 205b might be the left side suspension bellow of the vehicle, or vice versa.

The fluid channels 21, 22 are connected to respective flow portions in the first valve disc 107 of the valve arrangement 103.

The rotating portion 145 of the housing 140 comprises an external mounting section which in FIG. 1 receives a lever 143 for operating the valve 101. The lever comprises at its (in FIG. 1) rightmost end portion a coupling means 150 engage a portion of the vehicle. Mechanical elements for translating a control motion from the vehicle to the valve 101 may be rollers, steering rods, etc. . . . Upon actuation of the lever 143, the rotatable housing portion 145 is rotated relative to the base body 141 of the housing 140. The second valve disc 109 of the valve arrangement 103 is mounted non-rotatably with respect to the rotatable housing portion 145. Thus, upon actuation of the lever 143, the second valve disc 109 is rotated relative to the first valve disc 107 in this embodiment. The base body 141 and the rotatable housing part 145, as well as the rotatable housing part 145 and the housing lid 148, are sealed against dirt ingress with one or more dirt seals 152. the first air plenum 154 is thus exposed to atmospheric pressure (cf. FIGS. 1a and. 3).

The leveling valve 101 may optionally comprise a throttle 115a or 115c. FIG. 1 exemplarily shows throttle 115a which formed as a flow passage in the shape of a conical bore in the base body 141, connecting the first and second fluid channels 21,22 with each other. There may be a throttle formed in a contact surface between the first and second valve discs 107,109. Alternatively, there may be a throttle 115c formed in the first valve disc 107.

The fluid flow into and out of the leveling valve 101 of FIG. 1 are best seen from FIG. 1a. Most of the reference signs shown in FIG. 1a are also to be seen in FIG. 1 which is why in regard to these reference signs, explicit reference is made to FIG. 1.

The cross-section shown in FIG. 1a is a 90° rotation with respect to FIG. 1. The air flow into and out of leveling valve 101 is accomplished as will be explained hereinafter. The leveling valve 101 comprises in its base body 141 a fluid supply port 1. The fluid supply port 1 is in air-tight sealing contact with the first valve disc 107 and in fluid communication with a first air passage 117 in the first valve disc 107. The fluid supply port 1 also comprises a connector 142c similar to connectors 142a,b shown in FIG. 1 leading to the utilization elements 205a,b. Connector 142c is adapted for connection to a source 207 of pressurized air.

Adjacent the connector 142c, the fluid supply port 1 houses a check valve 5 comprising a lip seal 7, wherein the lip seal 7 is configured to allow fluid flow inwards, towards the valve arrangement 103, and which is configured to prevent flow outwards, meaning from the valve arrangement 103 towards the source of pressurized air 207.

The check valve 5 is mounted directly adjacent the connector 142c and extends in a first elongate section 9, cf. FIG. 1b. The lip seal 7 abuts against a wall 13 of the fluid supply port 1 in the first elongate section 9. Additionally, the fluid supply port 1 comprises a second elongate section 11 in which the connector 142c is mounted. In between the first and second elongate sections 9, 11, there is a transition zone 10, which comprises a conically tapered section. Optionally, a sealing element 12 may be arranged in between the check valve 5 and the connector 142c.

Through fluid supply port 1, pressurized air can be supplied through the first air passage 117 into a first flow portion 125 of the first valve disc 107 (FIG. 1). Depending on the angle of rotation of the second valve disc 109 relative to the first valve disc 107, air will be transported in fluid communication through a crosslink portion 137 of the second valve disc 109 to second and third air passages 119, 121 in the first valve disc and from there to the first and second fluid channels 21, 22 which lead towards the utilization elements 205a,b.

In the other switching scenario, air is being transported through the fluid channels 21, 22 and the second and third air passages 119, 121 of the first valve disc 107 into the second valve disc 109, through a second flow portion 127 in the second valve disc 109 and from there to a fourth air passage 123 in the first valve disc 107. The fourth air passage 123 in the first valve disc 107 is fluid communication with a second air plenum 156. Also in fluid communication to the second air plenum 156 is an exhaust port 3 provided in the base body 141 of leveling valve 101. The exhaust port 3 is sealed against entry of air with an air flap 158 which opens if the pressure inside the second air plenum 156 is greater than the atmospheric pressure outside of valve 101.

With continued reference to the reference signs mentioned with respect to FIGS. 1, 1a and 1b, further details of the check valve 5 are shown in FIGS. 2a-d. The check valve 5 is defined by an inlet side 4 and an outlet side 6. A flow path 8 is defined in between the inlet side 4 and the outlet side 6. The flow path is delimited by a base body 15 of the check valve 5 and the lip seal 7. When mounted, as shown in FIG. 1a, wall 13 of fluid supply port 1 also delimits the flow path 8.

The lip seal 7 comprises a sealing lip 17 and an annular base 19. The annular base 19 matingly engages a, preferably annular, recess 24 formed in the base body 15. The mating engagement prevents inadvertent removal of the lip seal 7 from the base body 15 of the check valve 5.

A first lateral passage 29 is provided in the base body 15, which is adapted to guide the flow path 8 radially outwards to the periphery 20 of the check valve 5. Air streaming into the check valve 5 from the inlet side 4 is led from within the check valve 5 to the periphery 20 and onto the lip seal 7. After passing the lip seal 7, a second lateral passage 31 provided in the base body 15 of the check valve 5 guides the flow path 8 back inside, away from the periphery 20 of the check valve 5.

On the outlet side 6 of the check valve 5, a number of positioning elements 23 are provided in the form of radial and/or axial protrusions, which act as end stops for the check valve 5 inside the fluid supply port 1. Also, the end stop at least axially define the mounted position of the check valve 5 inside the fluid supply port 1. Optionally, the positioning elements 23 are formed such that they also position the check valve 5 radially in the fluid supply port 1 as a centering aid.

The check valve 5 comprises on the inlet side 4 a positioning element 25, which is in the form of a ring. The positioning element 25 protrudes radially from the check valve 5 in order to determine the radial position of the check valve 5 inside the fluid supply port 1.

Optionally, the base body 15 may comprise an end stop 27, which is adapted to be an abutment for the fluid conduit which is introduced into the fluid supply port 1 and secured with the connector 142c. Also, the end stop 27 prevents the fluid conduit from being introduced too far into the fluid supply port and ensures that the recess 29 for guiding the flow path 8 outwards to the periphery 20 remains sufficiently open. As can also be seen from FIG. 2a, the sealing lip 17 of lip seal 7 is inclined at an angle α towards the outlet side 6 of the check valve 5. If an air flow enters check valve 5 from the outlet side 6 towards the sealing lip 17, the sealing lip is pressed against the inclination angle α, which leads to the sealing lip 17 pressing tightly against the outer wall of the fluid supply port 1. Contrary thereto, when in normal operating condition, air streaming into the check valve 5 from the inlet side 4 will easily deform the sealing lip 17 to flex away from the outer wall 13 of the fluid supply port 1 (cf. FIG. 1a).

Figure 2A:
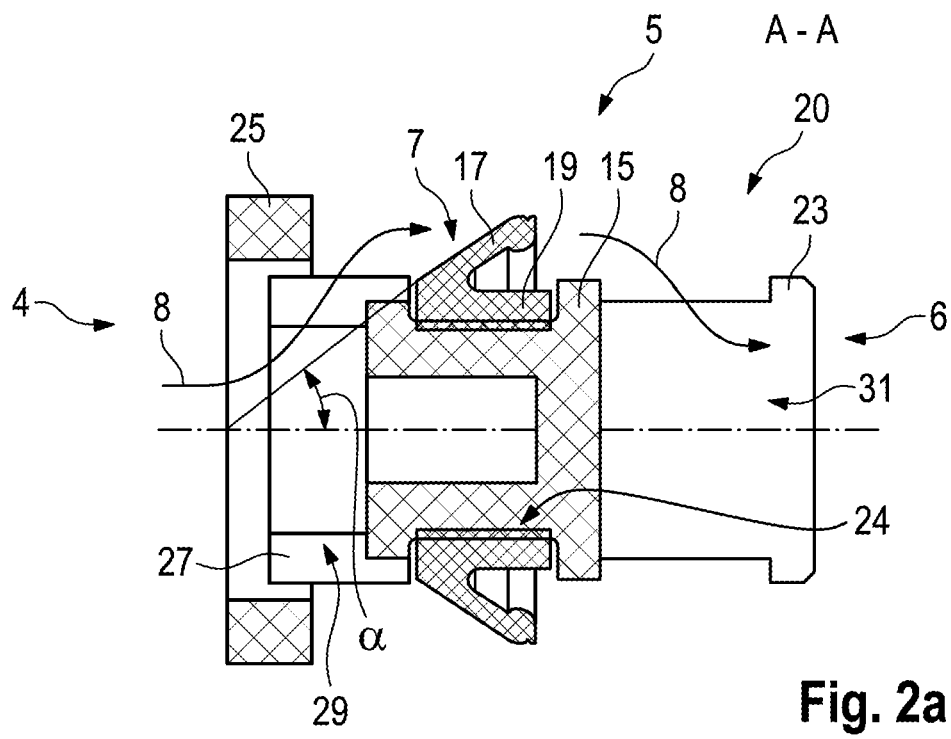
Figure 2B:
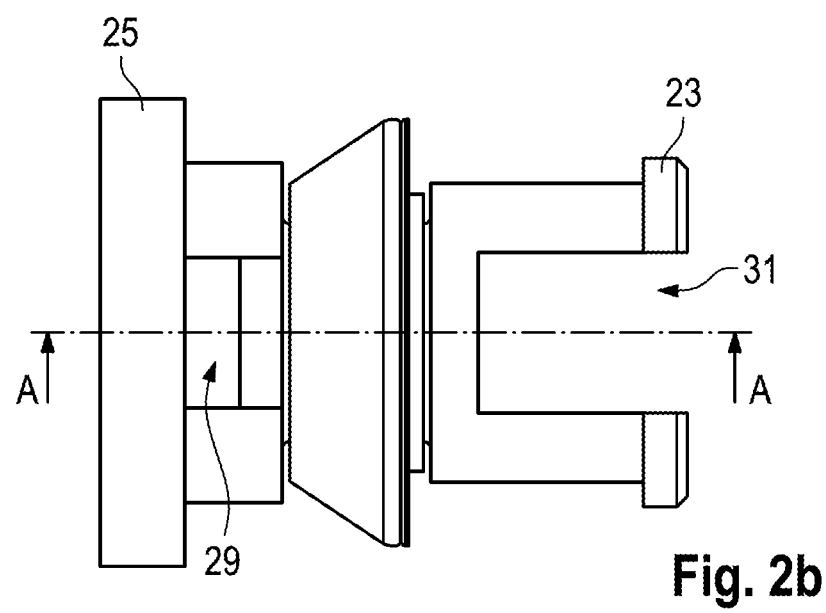
Figure 2C:
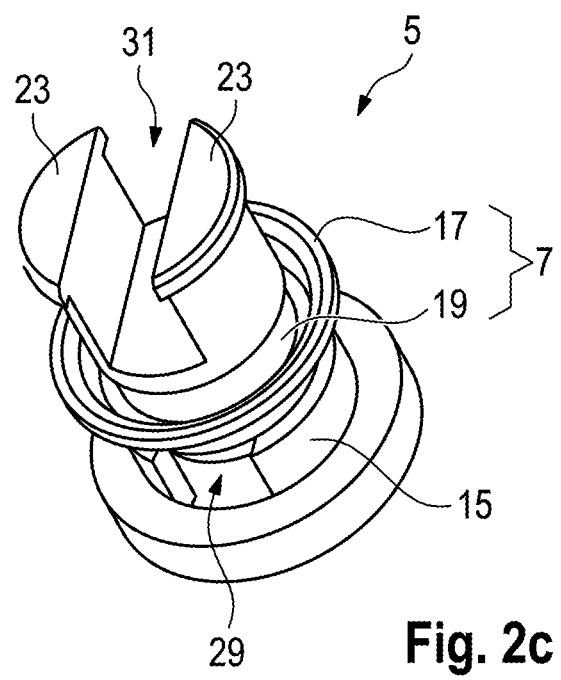
Figure 2D:
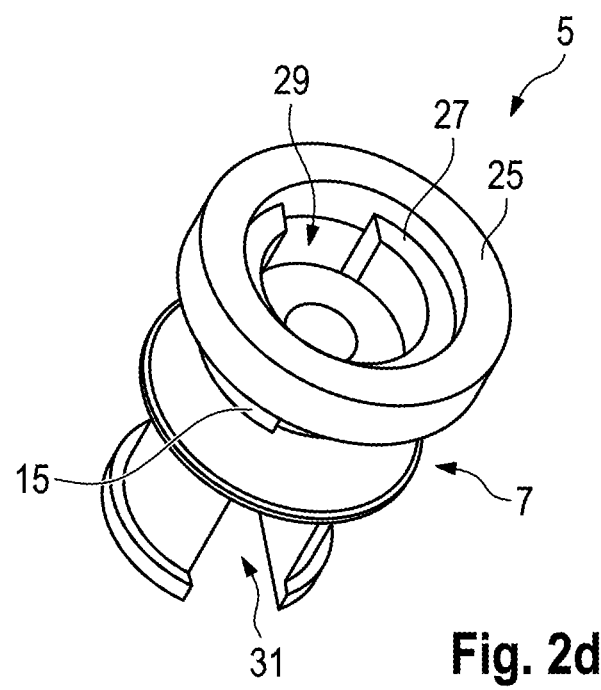
Figure 3:
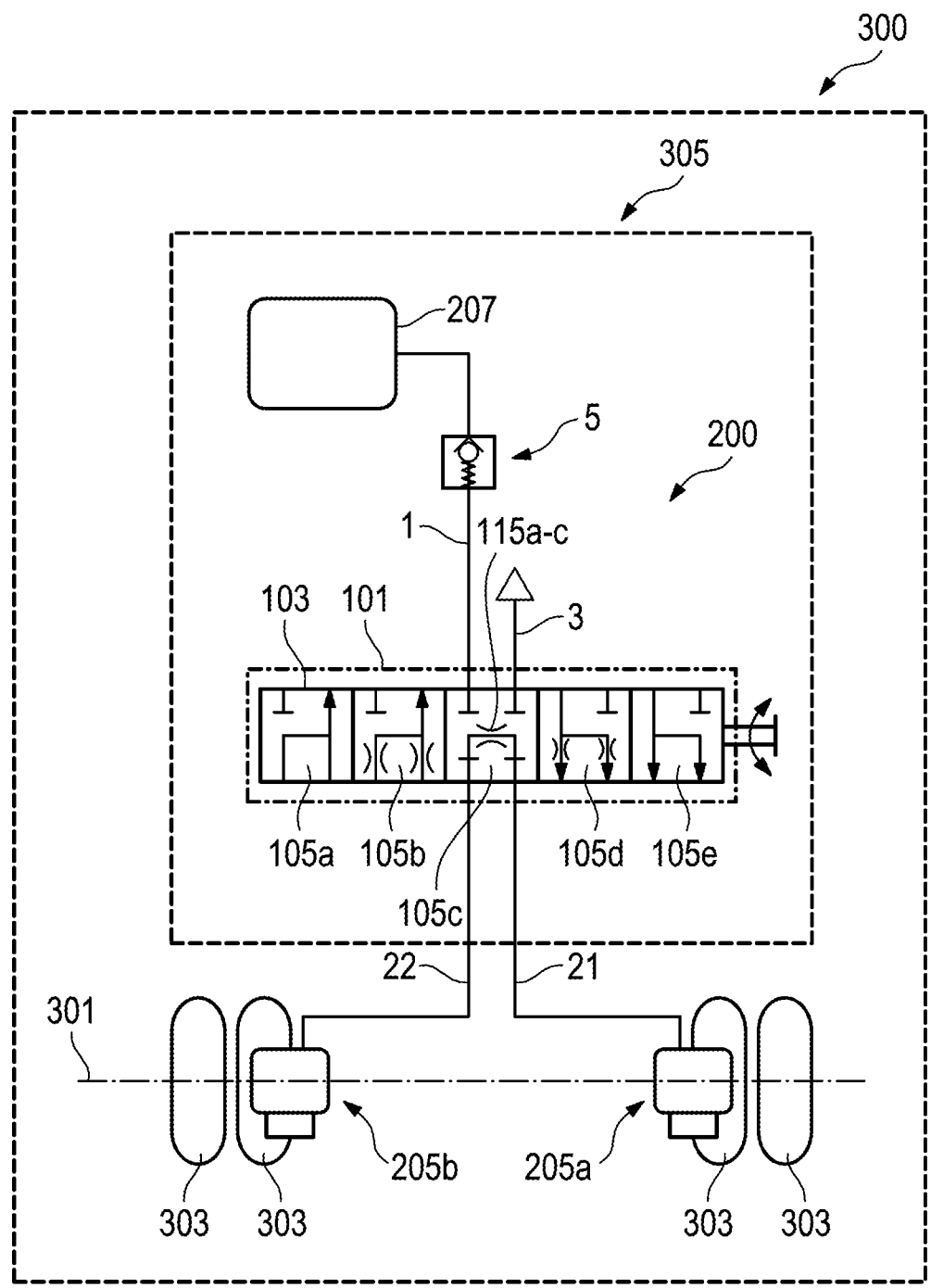
FIG. 3 shows a schematic representation of a vehicle including the leveling valve according to FIGS. 1 and 1a and the check valve according to FIGS. 2a-d.

FIG. 3 shows an exemplary use of the valve 101 according to the preferred embodiment of FIGS. 1 to 2d. In particular, FIG. 3 schematically shows a vehicle 300. The vehicle 300 comprises an axle 301 supporting a number of tires 303. The tires 303 and the axle 301 are linked through an air suspension system 200 to a superstructure 305. The air suspension system 200 comprises a plurality of utilization elements 205a,b such as pneumatic suspension bellows. The utilization elements 205a,b are functionally linked to the axle 301 and/or optionally directly to a single-tire support (not shown).

The utilization elements 205a,b are connected through a first fluid channel 21 and a second fluid channel 22 to the valve disc arrangement 103 of valve 101. Upon rotation of a lever (not shown in FIG. 5), such as lever 143 of FIG. 1, the valve 101 can be. Depending on the switching position, air is transported from the utilization elements through the valve 101 to an exhaust port 3. Alternatively, air can be supplied from a source 207 of pressurized air through fluid supply port 1 to the valve 101 and from thereon to the utilization elements 205a,b.

In this Specification, reference numerals have been used to represent the following elements:

1 fluid (air) supply port
3 fluid (air) exhaust port
4 inlet side
5 check valve
6 outlet side
7 lip seal
8 flow path
9 first elongate section
10 transition section
11 second elongate section
12 sealing element
13 wall
15 base body
17 sealing lip
19 annular base
20 outer periphery
21 first fluid (air) channel
22 second fluid (air) channel
23 (second) positioning element
24 recess
25 (first) positioning element
27 end stop
29 (first) lateral passage
31 (second) lateral passage
101 leveling valve
103 valve arrangement
107 first valve disc
109 second valve disc
115a,c throttle
117 first air passage (for connection to source of pressurized air)
119 second air passage (for connection to first utilization element)
121 third air passage (for connection to second utilization element)
123 fourth air passage (for connection to air exhaust)
125 first flow portion (of first air passage)
127 second flow portion (of fourth air passage)
137 crosslink flow portion
140 housing
141 base body of leveling valve
142a,b,c connectors
143 lever
145 rotatable housing port
147 spring
148 housing lid
150 coupling means
152 dirt seal
154 first air plenum
156 second air plenum
158 air flap
200 Air suspension system
205a,b utilization elements
207 source of pressurized air
300 vehicle
301 vehicle axle
303 tire
305 superstructure
α inclination angle While the above description constitutes the preferred embodiments of the present invention, it will be appreciated that the invention is susceptible to modification, variation and change without departing from the proper scope and fair meaning of the accompanying claims.

What is claimed is:

1. A leveling valve (101) for discharging and supplying air from and to a plurality of utilization elements (205a, b), the leveling valve (101) comprising:
   a valve arrangement (103) for directing air between a source (207) of pressurized air, an exhaust port (3) and the utilization elements;
   a supply port (1) connecting the valve arrangement (103) to the source (207) of pressurized air; and
   a check valve (5) mounted upstream of the valve arrangement (103), the check valve (5) being configured to allow fluid flow from the supply port (1) towards the valve arrangement (103) and to block fluid flow from the valve arrangement (103) through the supply port (1), the check valve comprising a base body (15) having
      an inlet side (4),
      an outlet side (6),
      an outer periphery (20), a flow path (8) extending through the base body (15) from the inlet side (4) to the outlet side (6); and a lip seal (7) with a sealing lip (17) configured to abut against a wall (13) of the supply port (1) when mounted, to flex away from the wall (13) in response to air flowing from the inlet side (4) towards the sealing lip (17), and to sealingly lie against the wall (13) in response to air flowing from the outlet side (6) towards the sealing lip (17).

2. The leveling valve of claim 1, wherein the check valve (5) is installed in the supply port (1).

3. The leveling valve of claim 1, wherein the supply port (1) comprises a first elongate section (9) holding the check valve (5), and a second elongate section (11) adjacent the first elongate section (9) holding a connector (142c), the connector (142c) being configured for sealingly connecting a fluid conduit to the supply port (1).

4. The leveling valve of claim 3, wherein the connector (142c) has an inner dimension such that when in the mounted state, the fluid conduit abuts against the check valve (5).

5. The leveling valve of claim 1, wherein the utilization elements are a plurality of suspension bellows.

6. The leveling valve of claim 1, wherein the base body (15) has a recess (24) on the outer periphery (20), and the lip seal (7) is in mating engagement with the recess (24).

7. The leveling valve of claim 1, wherein the check valve (5) consists of the base body (15) and the lip seal (7).

8. The leveling valve of claim 1, wherein the base body (15) comprises:

a first lateral passage (29) configured to guide the flow path (8) toward the periphery (20) of the base body (15), and a second lateral recess (31) configured to guide the flow path (8) away from the periphery (20) of the base body (15), the lip seal (7) being arranged in between the first and second lateral passages (29, 31).

9. The leveling valve of claim 1, wherein the base body (15) comprises at least one first positioning element (25) configured to radially define a mounting position of the check valve (5).

10. The leveling valve of claim 1, wherein the base body (5) comprises at least one second positioning element (23) configured to define, at least axially or radially, a mounting position of the check valve (5).

11. An air suspension system (200) for use in a vehicle, comprising a plurality of suspension bellows, a leveling valve (101) for discharging and supplying air from and to the utilization elements (205a,b) according to claim 1, and a source (207) of pressurized air connected to a fluid supply port (1) of the leveling valve (101).

12. A check valve arrangement for use in a leveling valve (101) for discharging and supplying air from and to a plurality of utilization elements (205a, b), the check valve arrangement comprising:

a check valve (5) having a base body (15) with an inlet side (4), an outlet side (6), an outer periphery (20) and a flow path (8) extending through the base body (15) from the inlet side (4) to the outlet side (6), and a lip seal (7); and a supply port (1) having a first elongate section (9) holding the check valve (5), and a second elongate section (11) adjacent the first elongate section (9) holding a connector (142c), the connector (142c) being configured for sealingly connecting a fluid conduit from a source of pressurized air to the supply port (1), wherein the lip seal comprises a sealing lip (17) configured to abut against a wall (13) of the supply port (1) when mounted, to flex away from the wall (13) in response to air flowing from the inlet side (4) towards the sealing lip (17), and to sealingly lie against the wall (13) in response to air flowing from the outlet side (6) towards the sealing lip (17).

13. The check valve arrangement of claim 12, wherein the check valve consists of the base body (15) and the lip seal (7), and wherein the base body (15) has a recess (24) on the outer periphery (20), and the lip seal (7) is in mating engagement with the recess (24).

14. A vehicle (300) comprising a plurality of tires (303) mounted on a vehicle axle (301), a superstructure (305), and an air suspension system (200) according to claim 13 coupling the axle (301) to the superstructure (305).

\* \* \* \* \*